(12) United States Patent
Lipan et al.

(10) Patent No.: US 9,742,278 B2
(45) Date of Patent: Aug. 22, 2017

(54) EVENT-BASED SWITCHING FOR POWER CONVERSION

(71) Applicant: SOLANTRO SEMICONDUCTOR CORP., Ottawa, Ontario (CA)

(72) Inventors: Tudor Lipan, Ottawa (CA); Christian Dino Gerolami, Ottawa (CA)

(73) Assignee: SOLANTRO SEMICONDUCTOR CORP. (CA)

( * ) Notice: Subject to any disclaimer, the term of this patent is extended or adjusted under 35 U.S.C. 154(b) by 30 days.

(21) Appl. No.: 14/881,809

(22) Filed: Oct. 13, 2015

(65) Prior Publication Data

US 2017/0104414 A1    Apr. 13, 2017

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
CPC .. H02M 3/158; H02M 3/1588; H02M 3/1582; H02M 2001/0009
See application file for complete search history.

(56) References Cited

U.S. PATENT DOCUMENTS

| | | | | |
|---|---|---|---|---|
| 4,801,813 A | * | 1/1989 | Kersenbrock | G05B 19/045 290/40 R |
| 6,356,615 B1 | * | 3/2002 | Coon | G06F 11/3409 377/16 |
| 6,944,034 B1 | | 9/2005 | Shteynberg | |
| 6,956,750 B1 | | 10/2005 | Eason | |
| 7,433,211 B1 | * | 10/2008 | Collmeyer | H02M 1/4225 323/282 |
| 2003/0076251 A1 | * | 4/2003 | Gupta | G04F 10/005 341/133 |
| 2004/0095020 A1 | | 5/2004 | Kernahan | |
| 2013/0057330 A1 | * | 3/2013 | Steedman | H03K 7/08 327/293 |
| 2013/0307509 A1 | * | 11/2013 | Henzler | H02M 3/157 323/283 |
| 2014/0136876 A1 | * | 5/2014 | Steedman | H03K 5/1515 713/501 |
| 2014/0355309 A1 | * | 12/2014 | Akondy | H02M 3/335 363/16 |
| 2016/0132369 A1 | * | 5/2016 | Lee | G06F 9/4806 713/2 |

OTHER PUBLICATIONS

Extended European Search Report issued in respect of EP Application No. 16 19 2680 on Mar. 14, 2017 (7 pages).

* cited by examiner

*Primary Examiner* — Adolf Berhane
*Assistant Examiner* — Sisay G Tiku
(74) *Attorney, Agent, or Firm* — Barnes & Thornburg, LLP

(57) ABSTRACT

In event-based switching for power conversion, binary electrical event signals are selected from a number of available binary electrical event signals. Fewer than all of the available binary electrical event signals are selected. The selected binary electrical event signals are optionally processed in generating respective processed binary electrical event signals. One of the respective processed binary event signals is selected as a switch turn-on signal and another of the respective processed binary electrical event signals is selected as a switch turn-off signal, to control at least one switch in a switching mode power converter.

21 Claims, 12 Drawing Sheets

EVENT-BASED SWITCHING FOR POWER CONVERSION

TECHNICAL FIELD

Embodiments herein generally relate to power conversion, and more specifically to switching control in switching mode power converters.

DESCRIPTION OF RELATED ART

Switching mode power converters convert power from one form to another. For example a Direct Current (DC) to Alternating Current (AC) power converter converts power at a DC voltage into power at an AC voltage. A DC to DC converter might convert power at a variable DC input voltage to power at a constant DC output voltage. Power converters can be bi-directional, converting power in both directions. Power converters might produce real power or reactive power. A power converter producing only reactive power is sometimes referred to as a VAr (Volts Amps reactive) compensator.

SUMMARY

An aspect of the present disclosure relates to a switching controller for control of switches in a switching mode power converter. The switching controller includes: a selector, an event processor, and a conversion controller. The selector is programmable to select at least any two binary electrical event signals from a plurality of binary electrical event signals that are available at an input of the selector. The at least two binary electrical event signals include fewer than all of the available binary electrical event signals. The event processor is coupled to the selector, and is programmable to optionally process the at least two binary electrical event signals in generating respective processed binary electrical event signals. The conversion controller is coupled to the event processor, and is programmable to select one of the respective processed binary electrical event signals as a switch turn-on signal and select another of the respective processed binary electrical event signals as a switch turn-off signal, to control at least one of the switches in the switching mode power converter.

The switching mode power converter could operate in a plurality of event based modes of operation. For each event based mode of operation, the selector is programmable to select the at least two binary electrical event signals corresponding to a current mode of operation of the plurality of modes of operation, in an embodiment. In another embodiment, the conversion controller is programmable to select processed binary electrical event signals as the switch turn-on and switch turn-off signals corresponding to a current mode of operation of the plurality of modes of operation.

The switching controller could also include a mode change controller, operatively coupled to the event processor and to the conversion controller, that is programmable to select at least one processed binary electrical event signal from the event processor and to provide to the conversion controller a mode change instruction, to control timing of a change in mode of operation of the switching mode power converter from a current mode of operation to another mode of operation of the plurality of modes of operation, based on the at least one processed binary electrical event signal selected by the mode change controller from the event processor.

The switching controller could also include a fault controller operatively coupled to the selector to receive at least one binary electrical event signal from the selector and to generate a fault signal to disable an output of the switching mode power converter based on the at least one binary electrical event signal received by the fault controller. In an embodiment, the timing of one or both of the switch turn-on signal and the switch turn-off signal in a switching cycle is based on the binary electrical event signals.

The plurality of binary electrical event signals could include any one or more of: a binary electrical event signal indicating that a current has reached a threshold current value; a binary electrical event signal indicating that a voltage has reached a threshold voltage value; a binary electrical event signal indicating that a slew rate of current has reached a threshold current slew rate value; a binary electrical event signal indicating that a slew rate of voltage has reached a threshold voltage slew rate value.

In an embodiment, the event processor is programmable to output each processed binary electrical event signal under one or more of the following conditions: the binary electrical event signal that is processed into a processed binary electrical event signal was received within a timing window; after a delay time from receipt of the binary electrical event signal; after a number of occurrences of the binary electrical event signal; if the binary electrical event signal is not received within an amount of time.

The switching controller could also include a window controller, operatively coupled to the event processor, that is programmable to select at least one switch control signal from a plurality of switch control signals, to provide timing window control of binary electrical event signal processing by providing trigger signals to the event processor based on timing of the at least one selected switch control signal. The event processor could be configured to ignore a selected binary electrical event signal that is received outside a timing window indicated by a trigger signal received from the window controller.

The event processor could include a plurality of processing circuits to process respective selected binary electrical event signals. In an embodiment, each of the processing circuits includes one or more of: a skip counter programmable to pass a signal, or count occurrences of a respective selected binary electrical event signal and provide an output responsive to counting a programmable number of occurrences of the respective selected binary electrical event signal; a time out controller, programmable to pass a signal or to generate a binary electrical event signal if the binary electrical event signal is not received after a programmable time out period; a delay circuit, programmable to pass a signal or apply a programmable time delay to the signal; a force circuit, programmable to pass a signal or generate a respective selected binary electrical event signal independently of occurrence of an electrical event corresponding to the respective selected binary electrical event signal.

The switching controller could also include a Pulse Width Modulation (PWM) based conversion controller.

In an embodiment, a number of binary electrical event signals selected by the selector, and a number of switch turn-on and switch turn-off signals generated by the conversion controller are programmable.

A method to generate switching control signals for control of switches in a switching mode power converter includes: receiving a plurality of binary electrical event signals; selecting at least any two binary electrical event signals from the plurality of binary electrical event signals, the at least two binary electrical event signals comprising fewer than all of the plurality of binary electrical event signals; optionally processing the at least two binary electrical event signals in generating respective processed binary electrical event signals; selecting one of the respective processed binary event signals as a switch turn-on signal and selecting another of the respective processed binary electrical event signals as a switch turn-off signal, to control at least one of the switches in the switching mode power converter.

The method could also involve: detecting occurrence of a plurality of electrical events in the switching mode power converter; generating the plurality of binary electrical event signals responsive to detecting respective ones of the plurality of electrical events.

As noted above, the switching mode power converter operates in a plurality of event based modes of operation. For each event based operating mode, the selecting at least any two binary electrical event signals from the plurality of binary electrical event signals could involve selecting the at least two binary electrical event signals corresponding to a current mode of operation of the plurality of modes of operation, or the selecting one of the at least two processed selected binary event signals and the selecting another of the at least two processed binary event signals corresponds to a current mode of operation of the plurality of modes of operation. The method could also involve selecting at least one processed binary electrical event signal; and controlling timing of a change in mode of operation of the switching mode power converter from a current mode of operation to another mode of operation of the plurality of modes of operation based on the at least one selected processed binary electrical event signal.

In an embodiment, the method also involves selecting at least one binary electrical event signal from the plurality of binary event signals and detecting a fault based on the at least one selected binary electrical event signal.

The plurality of binary electrical event signals, as noted above, could include any one or more of: a binary electrical event signal indicating that a current has reached a threshold current value; a binary electrical event signal indicating that a voltage has reached a threshold voltage value; a binary electrical event signal indicating that a slew rate of current has reached a threshold current slew rate value; a binary electrical event signal indicating that a slew rate of voltage has reached a threshold voltage slew rate value.

The method could also involve: selecting at least one switch control signal from a plurality of switch control signals; setting a timing window based on timing of the at least one selected switch control signal; and ignoring a selected binary electrical event signal that is received outside the timing window.

In an embodiment, the method also includes one or more of: passing a respective selected binary electrical event signal, or counting occurrences of a respective selected binary electrical event signal and providing an output responsive to counting a programmable number of occurrences of the respective selected binary electrical event signal; passing a respective selected binary electrical event signal or generating a binary electrical event signal if the binary electrical event signal is not received after a time out period; passing a respective selected binary electrical event signal or applying a time delay to the respective selected binary electrical event signal; generating a respective binary electrical event signal independently of occurrence of an electrical event corresponding to the respective binary electrical event signal.

The method could also include generating a PWM based switching control signal, to control at least one of the switches in the switching mode power converter.

Other aspects and features of embodiments of the present disclosure will become apparent to those ordinarily skilled in the art upon review of the following description.

DETAILED DESCRIPTION

Switching mode power converters convert power through the opening and closing of their switches. Switching mode converters can produce real power, reactive power or a combination of real and reactive power. Switching mode power converters can be uni-directional, converting power at one set of terminals into power at a second set of terminals in one direction, or they can be bi-directional, converting power in either direction between sets of terminals. The timing of switch opening and closing regulates the output of the power converter and affects power conversion efficiency. Therefore, switch control and timing is an important part of the operation of a switching mode power converter.

There are a wide variety of switching mode power converter circuit topologies including but not limited to: buck converters, boost converters, buck-boost converters, flyback converters, forward converters, half-bridge converters, full bridge converters and Dual Active Bridge (DAB) converters. In addition, some power converter circuit topologies can have multiple modes of operation.

Figure 1A:
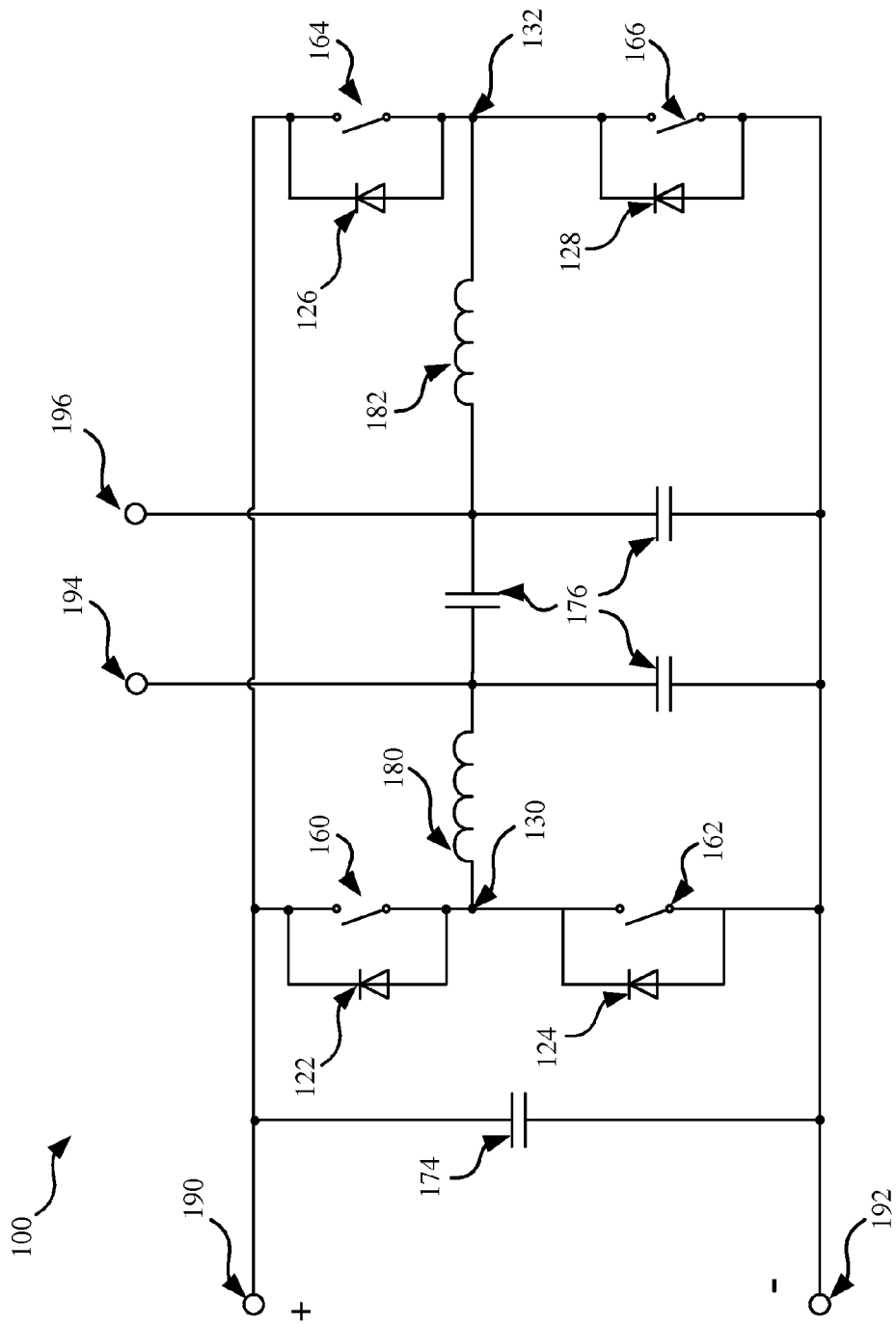
FIG. 1A is a schematic diagram of an example Dual Half Bridge switching mode power converter.

FIG. 1A is a schematic diagram of an example Dual Half Bridge switching mode power converter, which is hereinafter referenced as Dual Half Bridge 100. Dual Half Bridge 100 comprises first terminal pair 190, 192; second terminal pair 196, 194, first capacitor 174, output capacitors 176, inductors 180, 182, high side switches 160, 164, low side switches 162, 166 and diodes 122, 124, 126, 128. In one embodiment switches 160, 162, 164, 166 are power Metal Oxide Semiconductor Field Effect Transistors (MOSFETs) and diodes 122, 124, 126, 128 are their intrinsic body diodes and not separate diodes. Similarly, one or more of the capacitors and/or inductors shown in FIG. 1A and the other drawings could be parasitic or intrinsic capacitance or inductance of another component rather than discrete capacitors or inductors.

Figure 1B:
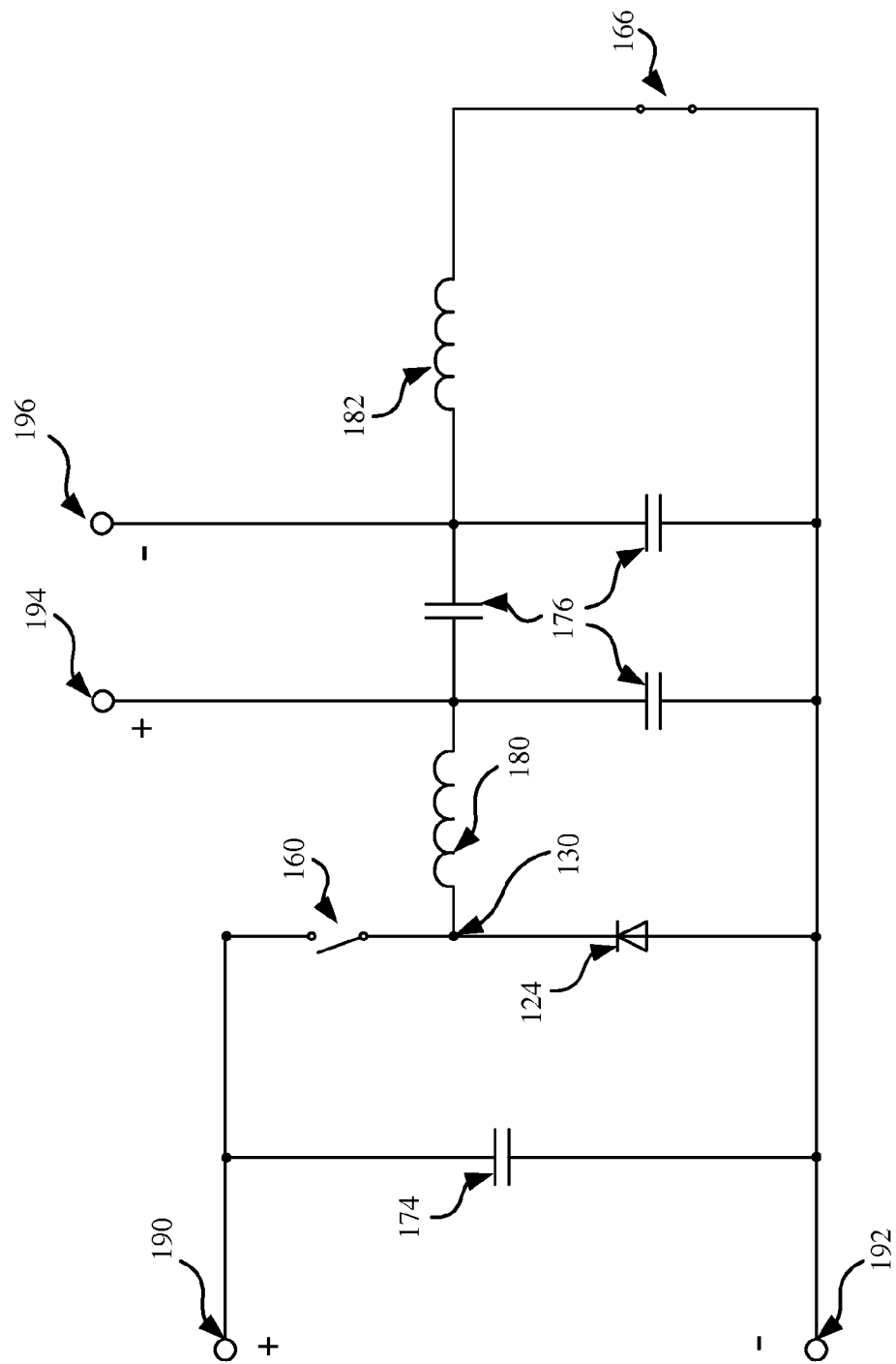
FIG. 1B is a schematic diagram of an equivalent circuit corresponding to operation of the Dual Half Bridge switching mode power converter in FIG. 1A as a single asynchronous buck converter.

Dual Half Bridge 100 can be operated in a number of different modes. FIG. 1B is a schematic diagram of an equivalent circuit corresponding to operation of Dual Half Bridge 100 as a single asynchronous buck converter. In this mode switch 160, diode 124 and inductor 180 form an asynchronous buck converter. In this mode of operation high side switch 164 is OFF (non-conducting), low side switch 166 is ON (conducting), low side switch 162 is OFF and high side switch 160 is switched between ON and OFF states. Switches 162 and 164 and diodes 122, 126, 128 have not been shown in FIG. 1B, to more clearly illustrate the equivalent circuit. In this mode a DC input voltage is received at first terminals 190, 192 and a lower DC output voltage is provided at second terminals 196, 194. The ratio of the output voltage to the input voltage is determined by the duty cycle of switch 160. The duty cycle of a switch is the ratio of the ON time of the switch to the switching period.

Figure 1C:
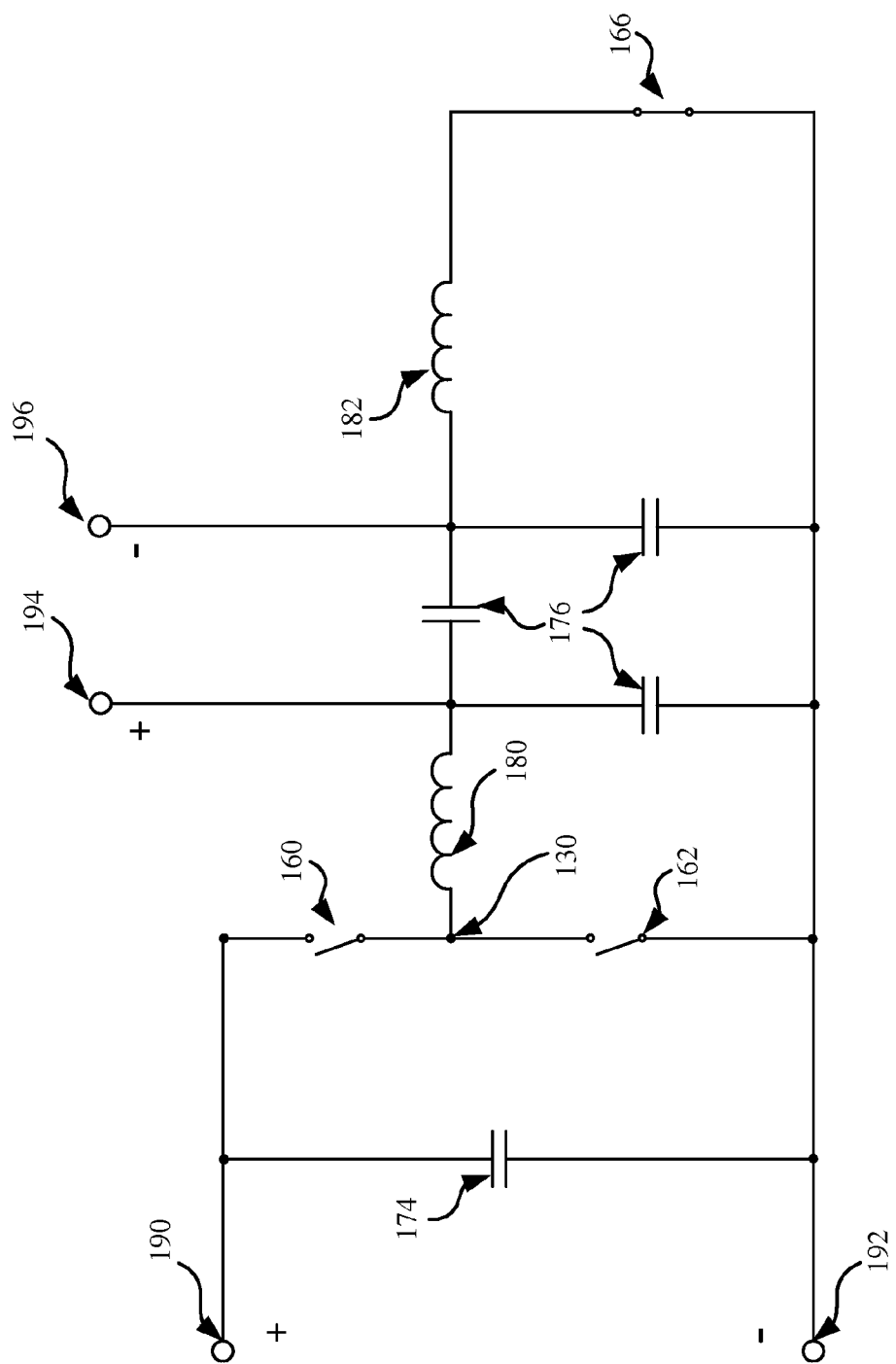
FIG. 1C is a schematic diagram of an equivalent circuit corresponding to operation of the Dual Half Bridge switching mode power converter in FIG. 1A as a single synchronous buck converter.

Dual Half Bridge 100 can also be operated as a synchronous buck converter. FIG. 1C is a schematic diagram of an equivalent circuit corresponding to operation of Dual Half Bridge 100 as a single synchronous buck converter. In this mode of operation switches 160 and 162 and inductor 180 form a synchronous buck converter. In this mode of operation high side switch 164 is OFF (and has not been shown, to more clearly illustrate the equivalent circuit) and low side switch 166 is ON and switches 160, 162 are operated in a complementary fashion. When switch 160 is ON and conducting switch 162 is OFF and non-conducting. When switch 162 is ON and conducting switch 160 is OFF and non-conducting. In this mode a DC input voltage is received at first terminals 190, 192 and a lower DC output voltage is provided at second terminals 196, 194.

The equivalent circuit of FIG. 1C also corresponds to operation of the Dual Half Bridge 100 as a synchronous boost converter in the reverse direction. Power at an DC input voltage could be provided at terminal pair 194, 196 and converted to power at a higher DC output voltage at terminal pair 190, 192.

Figure 1D:
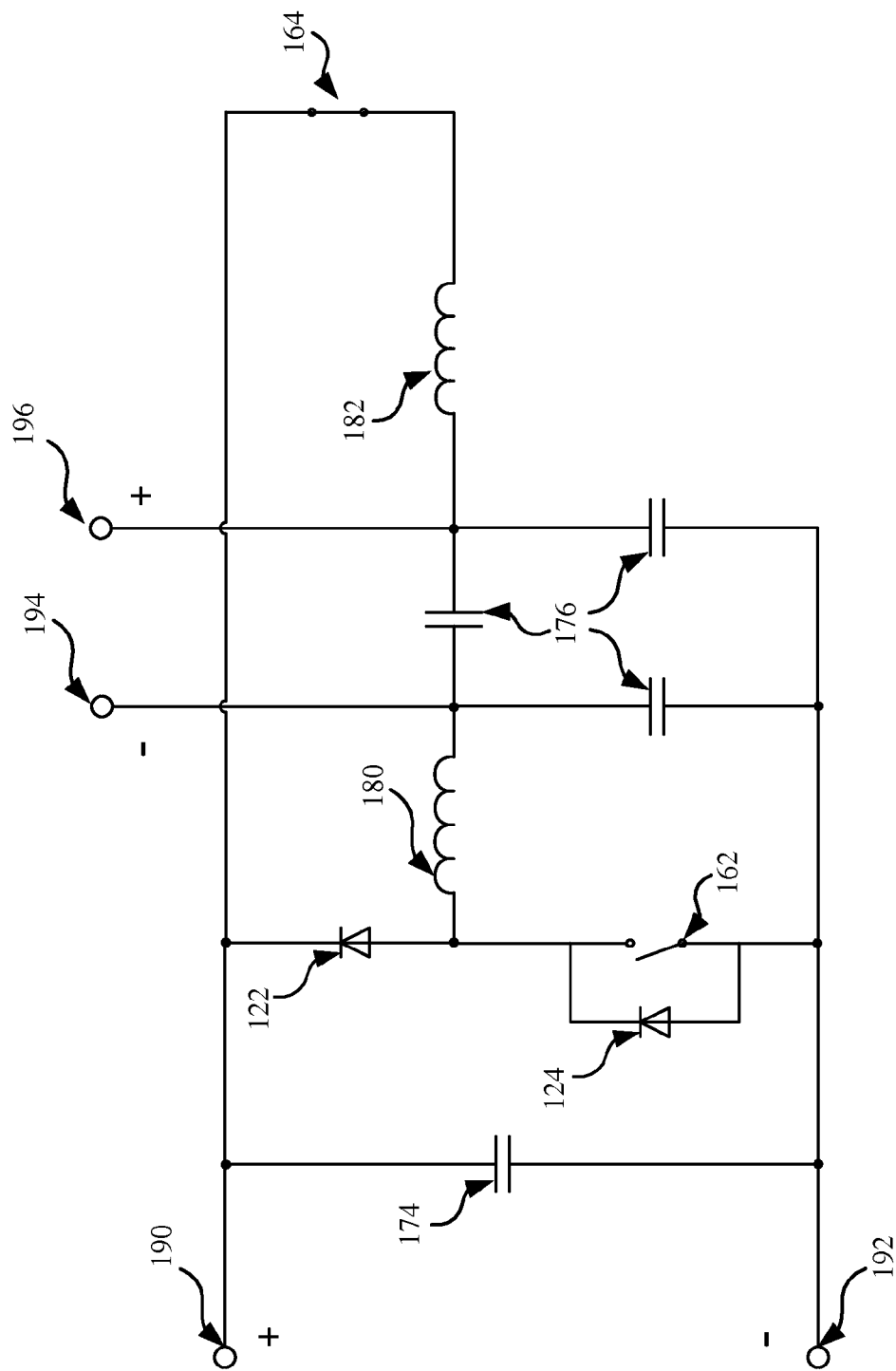
FIG. 1D is a schematic diagram of an equivalent circuit corresponding to operation of the Dual Half Bridge switching mode power converter in FIG. 1A as an asynchronous boost converter.

Dual Half Bridge 100 can also be operated as an asynchronous boost converter. FIG. 1D is a schematic diagram of an equivalent circuit corresponding to operation of Dual Half Bridge 100 as an asynchronous boost converter. In this mode of operation, switch 162, diode 122 and inductor 182 form an asynchronous boost converter. Switch 164 is ON, switches 166 and 160 are OFF (and have not been shown, to more clearly illustrate the equivalent circuit) and switch 162 is switched between ON and OFF states. In this mode a DC input voltage is received at first terminals 190, 192 and a higher DC output voltage is provided at second terminals 196, 194. The ratio of output voltage $V_{OUT}$ to input voltage $V_{IN}$ is given by the formula $$\frac{V_{OUT}}{V_{IN}} = \frac{1}{1-D}$$

where D is the duty cycle of switch 162.

Figure 1E:
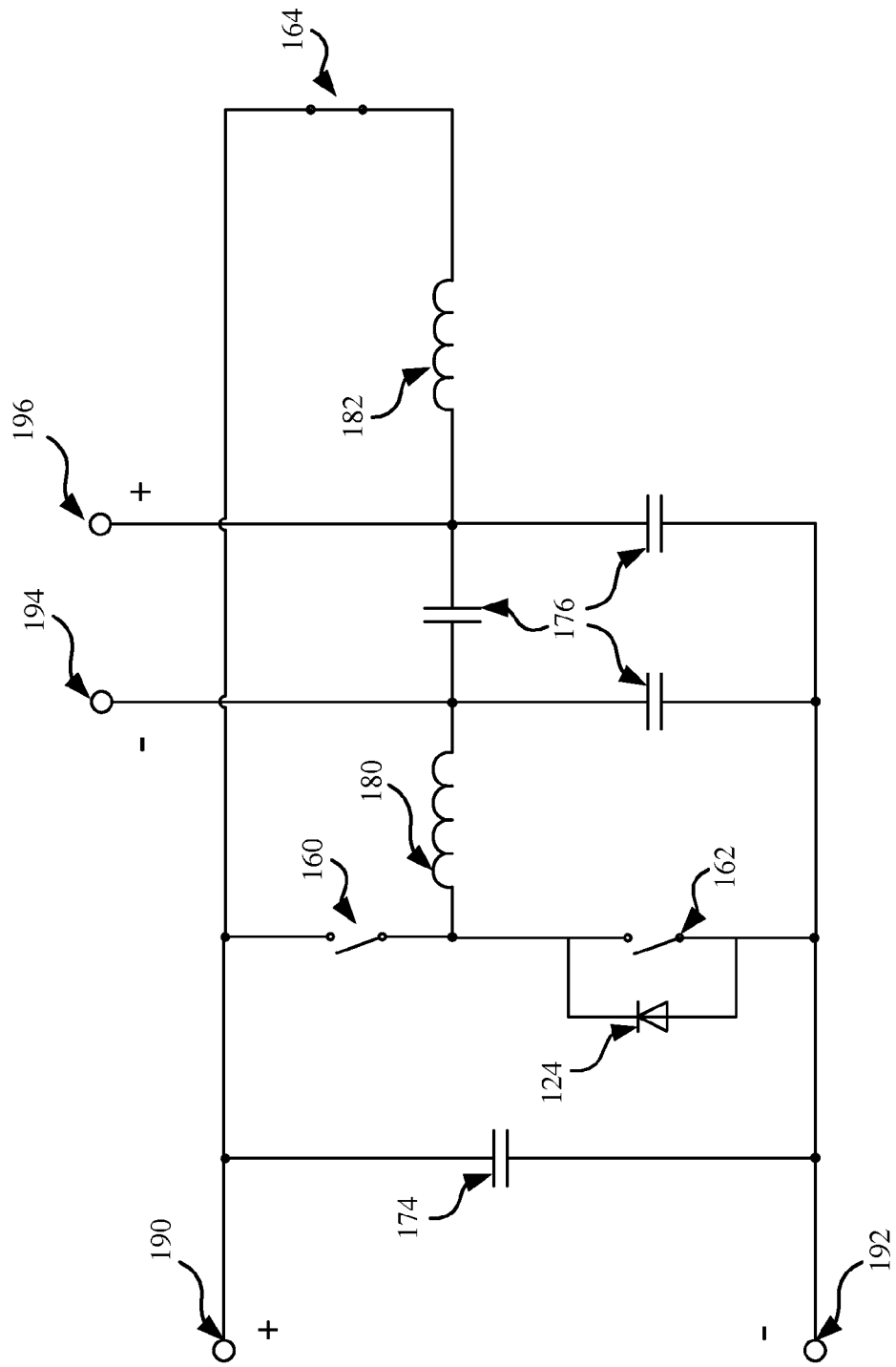
FIG. 1E is a schematic diagram of an equivalent circuit corresponding to operation of the Dual Half Bridge switching mode power converter in FIG. 1A as a synchronous boost converter.

Dual Half Bridge 100 can also be operated as a synchronous boost converter. FIG. 1E is a schematic diagram of an equivalent circuit corresponding to operation of Dual Half Bridge 100 as a synchronous boost converter. In this mode of operation switches 162 and 160 and inductor 182 form a synchronous boost converter. Switch 164 is ON, switch 166 is OFF (and has not been shown, to more clearly illustrate the equivalent circuit) and switches 160 and 162 are switched in a complementary fashion. When switch 160 is ON and conducting switch 162 is OFF and non-conducting. When switch 162 is ON and conducting switch 160 is OFF and non-conducting. In this mode a DC input voltage is received at first terminals 190, 192 and a higher DC output voltage is provided at second terminals 196, 194.

Figure 1F:
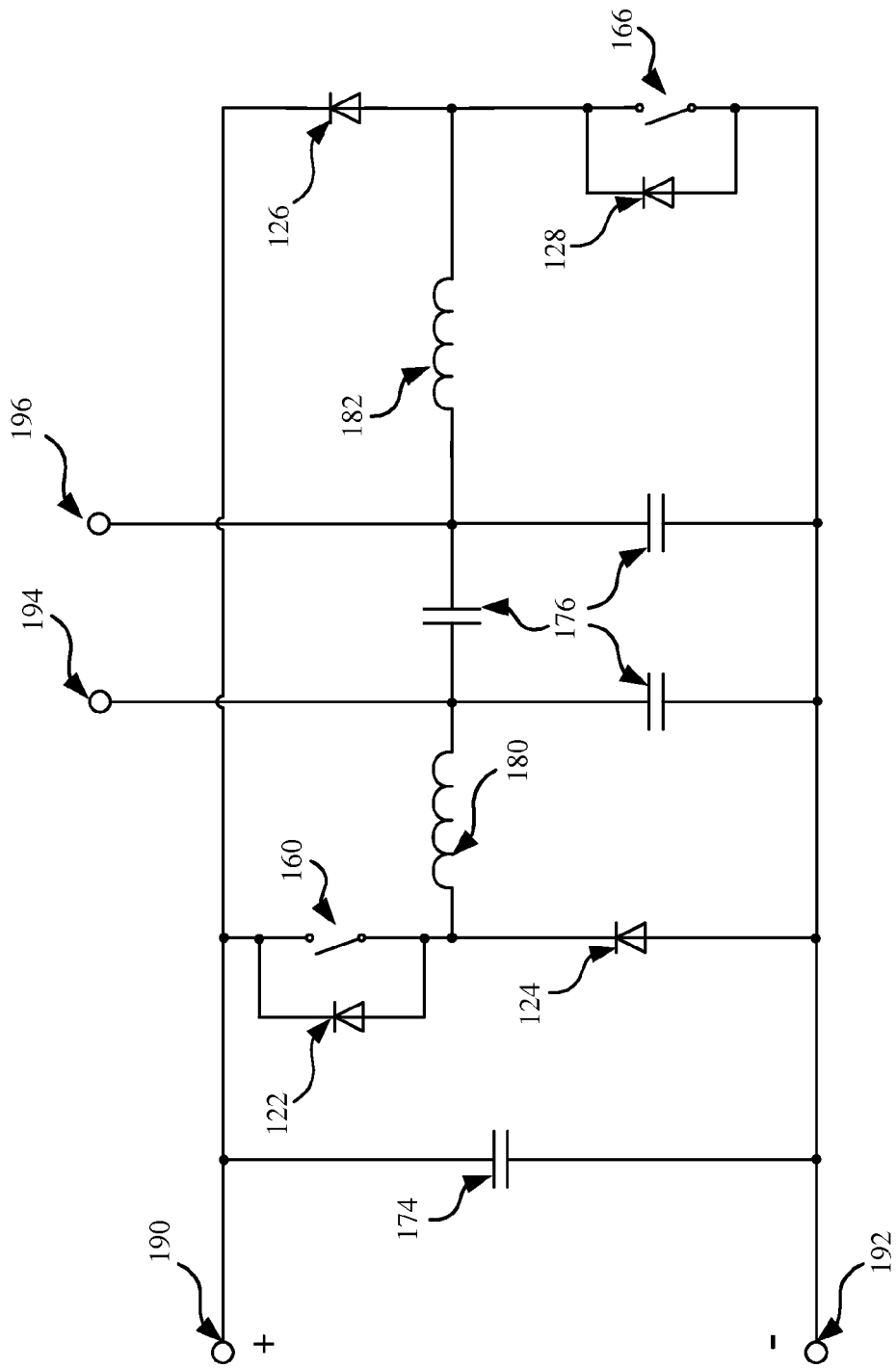
FIG. 1F is a schematic diagram of an equivalent circuit corresponding to operation of the Dual Half Bridge switching mode power converter in FIG. 1A as an asynchronous buck converter on one side and an asynchronous boost converter on the other side.

Dual Half Bridge 100 can also be operated as an asynchronous buck converter on one side and an asynchronous boost converter on the other. FIG. 1F is a schematic diagram of an equivalent circuit corresponding to operation of Dual Half Bridge 100 in this manner. In this mode of operation switch 160, diode 124 and inductor 180 form a buck converter and switch 166, diode 126 and inductor 182 form a boost converter. Switches 162, 164 are OFF (and have not been shown, to more clearly illustrate the equivalent circuit). The buck and boost converters may be operated independently. In this mode power can flow in both directions. When the buck converter is operating power flows from terminal pair 190, 192 to terminal pair 194, 196. When the boost converter is operating power flows in the opposite direction.

In another mode of operation, the buck and boost converters on opposite sides of Dual Half Bridge 100 are operated as synchronous converters. It is also possible to operate Dual Half Bridge 100 as a synchronous buck or boost converter on one side and an asynchronous boost or buck converter on the other side.

Dual Half Bridge 100 can also be operated as a full bridge converter. In this mode switches 160, 162, 164, 166 form a full bridge converter. Switches 160, 166 form a first switch pair and switches 162, 164 form a second switch pair. The first and second switch pairs are operated in a complementary fashion. When the switches in the first switch pair are ON the switches in the second switch pair are OFF. When the switches in the first switch pair are OFF the switches in the second switch pair are ON.

It could be desirable to change the mode of operation of a power converter depending on operating conditions. For example, some modes of operation might be better suited for and more efficient at low power while other modes of operation might be suited to high power operation; some modes of operation might be more suited to producing real power while other modes are more suited to supplying reactive power; some modes might be more suited to producing a high voltage or current while others might be more suited to producing a lower voltage or current.

The switch timing and control to regulate the output of a power converter depends on the specific power converter topology and its mode of operation. Switch timing and control could be determined by the detection of electrical events which occur in the power converter and the consequent generation of switch control signals based on their occurrence.

Electrical events are inherently binary. They either have occurred or have not occurred. Switch control signals control the conduction state (ON or OFF) of the power converter's switches. An electrical event could therefore trigger a change in state of the power converter's switch(es). Electrical events could be detected as they occur and responded to in real time on every switching cycle of the power converter. The timing and duration of a switch control signal could be adjusted on every switching cycle based on the electrical event(s), such as by changing the timing of a switch turn-on signal and/or a switch turn-off signal.

The timing of one or both of the switch turn-on signal and the switch turn-off signal in a switching cycle is based on the binary electrical event signals for event-based switching control. The turn-on and turn-off signal timing is determined by the event signals. If they occur sooner in one cycle than in the preceding cycle, for example, then the turn-on and turn-off signals are generated sooner. Thus, cycle-by-cycle adjustments are from the events themselves in an embodiment.

An electrical event could be based on, for example, a voltage, a current or a rate of change of voltage or current.

A current based electrical event could be, for example, the current in a component of the power converter reaching an upper threshold and/or a lower threshold. For example, referring to FIGS. 1A to 1E, an electrical event could be the instantaneous value of current flowing in one of the inductors 180, 182 reaching an upper threshold value or a lower threshold value. When a change in state of a power converter's switch(es) is triggered by a current reaching an upper threshold, this is frequently referred to as peak current mode control. When a change in state of a power converter's switch(es) is triggered by a current reaching either an upper or a lower value, this is frequently referred to as peak and trough current mode control. It should be noted, however, that although these modes of operation and other modes of power converter operation discussed herein might be known, conventional power converter switching controllers are not selective as to event signals or programmable for multiple power converter topologies and/or multiple modes of operation as disclosed herein.

An electrical event could also or instead be the average value of current reaching a threshold value. Electrical current could be integrated over the switching cycle. The integration could start at the beginning of the switching cycle and be reset at the end of the cycle. This control method is frequently referred to as cycle by cycle average current mode control.

An electrical event could also be a current reaching a value of zero. For example, in Zero Current Switching (ZCS) topologies and methods a power converter switch is timed to open when the current in the switch is substantially zero.

Electrical events and control modes could also be voltage based. An electrical event could be, for example, a voltage reaching an upper limit, a lower limit, a maximum value, a minimum value or zero.

For example, US published application 2015/0016153, entitled "SWITCHING MODE POWER SUPPLY USING PULSE MODE ACTIVE CLAMPING" teaches a method of determining the timing of a voltage maximum at an electrical node and closing a clamp switch at a voltage maximum.

In Zero Voltage Switching (ZVS) topologies an electrical event could be the voltage across a switch reaching zero. US published application 2015/0016153 also teaches opening a primary conversion switch when the voltage across it is substantially zero.

In quasi-resonant power converter topologies an electrical event could be the voltage across a switch reaching a minimum value and the power converter's switch(es) changing state based on that event. For example, US published application 2014/0098572 "FORWARD BOOST POWER CONVERTER AND METHODS" teaches a first switch entering a conduction period when the voltage across it is at an oscillatory minimum.

An electrical event could also or instead be the rate of change of a current or voltage (commonly referred to as the "slew rate") reaching a threshold value. It could, for example, be the rate of change in the current flowing in inductor 180, 182 reaching a threshold value. Electrical events could be detected as they occur, by using any of a variety of analog circuits in some embodiments. For example, a comparator could be used to detect a voltage reaching a threshold value and a current sense resistor in combination with a comparator could be used to detect a current reaching a threshold value. A comparator compares the voltage of a signal to a reference voltage and outputs a digital signal of one polarity when the signal is greater than the value of the reference and a digital signal of the opposite polarity when the signal is less than the reference. A slew rate detector could be used to detect a slew rate.

Various examples of electrical events are noted above. Binary electrical event signals are indicative of detection of electrical events. In one embodiment, the binary electrical event signals that are available for selection for use in power conversion control include any one or more of the following: a binary electrical event signal indicating that a current has reached a threshold current value; a binary electrical event signal indicating that a voltage has reached a threshold voltage value; a binary electrical event signal indicating that a slew rate of current has reached a threshold voltage slew rate value. Reaching a threshold could involve reaching (or exceeding) an upper threshold, and/or reaching (or decreasing below) a lower threshold. Respective binary electrical event signals indicating that other electrical events have occurred are also possible, in addition to or instead of any of the examples noted above.

Different power converter topologies and modes of operation could control their switch(es) using different types of electrical events.

The exact relationship and timing between the occurrence of electrical events and the consequent switch control signal(s) is dependent on the power converter topology and mode of operation. For example: a switch control signal(s) might only be generated if the electrical event occurs within a certain timing window; a switch control signal might be generated after a certain delay time from the occurrence of the electrical event; a switch control signal(s) might only be generated after a fixed number of occurrences of an electrical event; or an event signal or switch control signal(s) might be generated if the electrical event does not occur after a specified time.

Electrical events could also or instead be usefully employed to determine the timing of a change in operating mode of a power converter. The unmanaged changing of modes could produce large and possibly disruptive transients. To safely change modes the timing of a mode change could be determined by an electrical event or a combination of electrical events. For example, for the dual half bridge of FIG. 1A, a mode change from the synchronous buck converter of FIG. 1C to the asynchronous buck converter of FIG. 1B might be safely initiated when switch 162 is open and switch 160 is closed, in which case the voltage at node 130 is substantially the same as the voltage at terminal 190.

Electrical events could also or instead be used to detect electrical faults in a power converter and safely disable the power converter. A fault could be, for example, an over voltage condition or an over current condition in the power converter. Detection of a fault condition could, for example, generate switch control signals to open all of the power converter's switches or otherwise effectively disable the power converter.

Due to the wide variety of power converter topologies and their possible modes of operation and the wide variety of associated electrical events involved in safely controlling these topologies and modes and managing transitions between them, a general purpose switching controller could be desirable. A general purpose switching controller could be capable of generating switching signals to: control power conversion for multiple power converter topologies and/or modes of operation; smoothly manage transitions between modes of operation; safely handle fault conditions.

Figure 2:
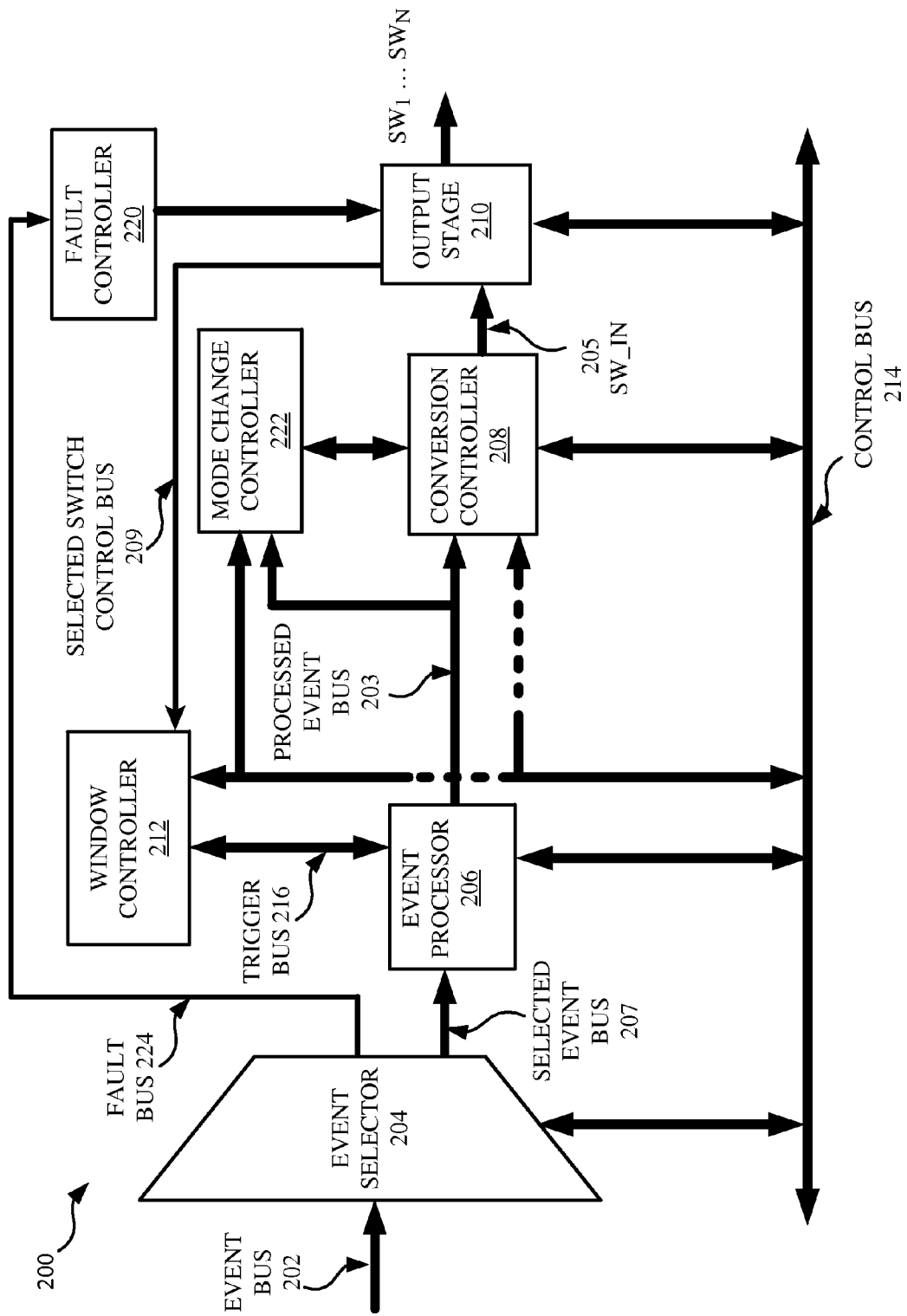
FIG. 2 is a block diagram of an example switching controller.

FIG. 2 is a block diagram of an example switching controller. Switching controller 200 comprises event selector 204, selected event bus 207, event processor 206, processed event bus 203, conversion controller 208, fault controller 220, mode change controller 222, selected switch control bus 209, preprocessed switch control bus 205, output stage 210, window controller 212, fault bus 224, and trigger bus 216. An event bus 202 and a control bus 214 are also shown for illustrative purposes, but need not be part of a switching controller.

Event selector 204, event processor 206, conversion controller 208, fault controller 220, mode change controller 222, output stage 210 and window controller 212 could all be implemented using digital logic, for example.

In an embodiment, switching controller 200 is implemented as part of a switching mode power converter controller integrated circuit (IC). In an embodiment, control bus 214 is an Advanced Microcontroller Bus Architecture (AMBA) bus.

Switching controller 200 receives a plurality of event signals, which are indicative of the occurrence of respective different electrical events within a power converter, from event bus 202 and produces switch control signals $SW_1 \ldots SW_N$ for control of a power converter's switches. Event signals are digital signals. Event signals could use active high logic in which a HIGH logic level signal indicates the electrical event has occurred and a LOW logic level signal indicates the electrical event has not occurred. Event signals could also or instead use active low logic in which a LOW logic level signal indicates the electrical event has occurred and a HIGH logic level signal indicates the electrical event has not occurred. Some event signals could use active high logic whereas other could use active low logic.

In one embodiment event bus 202 is 72 bits wide and carries up to 72 binary event signals. Event signals could be generated inside a power converter, at its input, and/or at its output responsive to detection of the occurrence of respective electrical events. Event signals could be generated by, for example a comparator, a sense amplifier and/or a slew rate detector.

Event selector 204 receives a plurality of event signals from event bus 202 and provides selected event signals to event processor 204 over selected event bus 207. Event selector 204 selects specific event signals and provides them to event processor 206 over selected event bus 207. Event selector 204 could comprise a programmable register into which data indicating the event signal(s) that are to be selected is written from control bus 214.

Selection of event signals could be determined by the desired mode of operation of the power converter, for example. Different event signals could be relevant to or useful for controlling switches for power conversion in different modes of operation, and the particular event signals that are useful for switch control in the current mode of operation are selected by the event selector 204 in an embodiment. Selection of event signals could also or instead be determined by the different intended modes of operation of the power converter. For example, different event signals could be useful in timing a safe transition between one operating mode and another operating mode.

Event selector 204 also provides selected event signals to fault controller 220 over fault bus 224 in the example shown. In one embodiment fault bus 224 is 8 bits wide. Event selector 204 could comprise another programmable fault select register into which data indicating the event signal(s) that are to be selected and provided to fault bus 224 is written from control bus 214. It should be appreciated that the event selector 204 selects from a set of event signals that includes not only event signals that are ultimately selected, but other event signals as well. Event signals that are useful for switch control in a current mode of operation of a power converter could be selected, for example, but event signals for other modes of operation are also available on the event bus 202. The event selector 204 is thus operable to select fewer than all available event signals. In general terms, event selector 204 is an example of a selector that is programmable, using one or more registers for example, to select at least any two binary electrical event signals from multiple binary electrical event signals that are available at an input of the selector. The at least two binary electrical event signals include fewer than all of the available binary electrical event signals.

In this manner, the example switching controller 200 could be a general purpose switching controller, which is configurable to control operation of a power converter in any of a plurality of operating modes, and/or to control any of a plurality of different types of power converters for which different events might be useful for switch control. For example, a switching mode power converter might operate in multiple event based modes of operation and, for each event based mode of operation, event selector 204 could be programmable, using one or more registers for example, to select the at least two binary electrical event signals corresponding to a current mode of operation. In another embodiment, the conversion controller 208 is programmable, using one or more registers for example, to select processed binary electrical event signals as the switch turn-on and switch turn-off signals corresponding to a current mode of operation. This type of flexibility is not possible in conventional control schemes in which switching control is converter-specific and/or specific to a particular operating mode.

The same event signal could be selected multiple times for transfer on multiple lines or channels of the selected event bus 207. For example, the selected event bus 207 might have 16 channels, but the same event signal could be selected for 2 different channels. Different processing could then be applied in parallel to the same event signal. For certain purposes such as fault detection, for example, it might be desirable to provide a fast processing path for an event signal that indicates occurrence of an over current condition, whereas the same event signal might be subject to delay for the purposes of controlling a switch in a power converter during normal operation of the power converter.

Event processor 206 processes selected event signals and provides respective processed event signals to conversion controller 208 over processed event bus 203. An example event processor 206 and examples of event signal processing are described below, with reference to FIG. 3.

Window controller 212 receives selected switch control signals from output stage 210 over selected switch control bus 209. Window controller 212 is programmable, using one or more registers for example, to select at least one switch control signal and to provide trigger signals to event processor 206 over trigger bus 216. Window controller 212 thus provides timing window control of electrical event signal processing, based on timing of the at least one selected switch control signal. A timing window is the time during which the occurrence of an electrical event is valid. Occurrence of an electrical event outside its timing window, as indicated by the trigger signals from the window controller 212, is considered invalid and is ignored by the event processor 206. A timing window could provide an electrical event signal with noise immunity and prevent spurious signals from disrupting the operation of the power converter. Spurious signals could be caused by, for example, noise generated from the closing or opening of the power converter's switches. In one embodiment selected control bus 209 comprises those SW_IN signals that are selected by output stage 210 to generate the switch control signals $SW_1 \ldots SW_N$. In another embodiment selected control bus 209 could comprise the switch control signals $SW_1 \ldots SW_N$ themselves, or versions intermediate between and the SW_IN and $SW_1 \ldots SW_N$ signals.

Trigger signals from window controller 212 signal to event processor 206 the beginning of an electrical event's timing window. Trigger signals could be generated by a change in state of the selected switch control signals. It could be a change of state of a single selected switch control signal or a change in state of a combination of multiple selected switch control signals. Window controller 212 could create a programmable delay between the change of state of the selected switch control signals and the generation of the trigger signal. The timing window could be ended by the occurrence of the processed electrical event as determined by the event processor 206 and communicated over trigger bus 216. The determination of which combination of selected switch control signals generate trigger signals, and options such as the programmable delay between the change of state of the selected switch control signals and the generation of the trigger signal, could be controlled by control bus 214. In an embodiment, this control is through a register into which data is written through control bus 214.

Conversion controller 208 receives the processed event signals and produces preprocessed switch control signals SW_IN on preprocessed switch control bus 205. Output stage 210 receives the preprocessed switch control signals and generates switch control signals $SW_1 \ldots SW_N$. In one embodiment there are 16 preprocessed switch control signals and 8 switch control signals. In an implementation in conjunction with the example Dual Half Bridge 100 (FIG. 1A), for example, up to four switch control signals could be generated by the output stage 210 to control the four switches. For a DAB converter with 8 switches, up to 8 switch control signals could be generated. In other embodiments, different numbers of switch control signals may be generated. More generally, a number of binary electrical event signals selected by the selector, and a number of switch turn-on and switch turn-off signals generated by the conversion controller are programmable.

The number of switch control signals relative to the number of switches is also not fixed. In some converter topologies or operating modes, one unique switch control signal is generated for each switch. In some embodiments, however, multiple switches in a power converter can be switched using the same switch control signal. With reference to FIG. 1A, for example, when switch pairs 160/166 and 162/164 are to be operated in a complementary fashion, the same switch control signal could be provided to both of the switches in any one switch pair. In this case, there are 4 switches controlled by only 2 switch control signals.

In an embodiment event selector 204 selects at least two binary electrical event signals, and event processor 206 is programmable, using one or more registers for example, to optionally process the at least two binary electrical event signals in generating respective processed binary electrical event signals. Conversion controller 208 is coupled to event processor 206, and is programmable, using one or more registers for example, to select one of the respective processed binary electrical event signals as a switch turn-on signal and select another of the respective processed binary electrical event signals as a switch turn-off signal, to control at least one of the switches in a switching mode power converter.

Conversion controller 208 is configured in an embodiment to generate the switch turn-on signal and the switch turn-off signal, based on the processed binary electrical event signals, in each switching cycle of the switching mode power converter. For example, conversion controller 208 could be configured to maintain or adjust timing of one or both of the switch turn-on signal and the switch turn-off signal, based on the processed binary electrical event signals, in each switching cycle. A timing adjustment need not necessarily be made in every switching cycle.

Mode change controller 222 is coupled to event processor 206 and conversion controller 208, and is programmable, using one or more registers for example, to select at least one processed binary electrical event signal from event processor 206 and to provide mode change instructions to conversion controller 208. A mode change instruction controls timing of a change in mode of operation of the switching mode power converter from a current mode of operation to another mode of operation, based on the at least one processed binary electrical event signal selected by mode change controller 222. A mode change instruction could, for example, instruct conversion controller 208 to change the power converter's operating mode. One or more processed event signals could be used to determine when in the switching cycle to initiate a mode change.

Mode change controller 222 could select which processed event signals are used to determine when to initiate a mode change. The choice of processed event signal(s) used in determining when to initiate a mode change could be programmed from control bus 214. Mode change controller 222 could comprise a programmable register into which data indicating the event signal(s) to be taken into account for operating mode control is written from control bus 214. The mode change controller 222 could, but need not necessarily, use the same processed event signal(s) as the conversion controller 208 to determine mode change timing. For example, for the dual half bridge of FIG. 1A and a mode change from operation as the synchronous buck converter of FIG. 1C to operation as the synchronous buck converter of FIG. 1B, mode change controller 222 could use a delayed version of the processed event signal that is used by conversion controller 208 to open switch 162, to also initiate the mode change.

Thus, a mode change instruction from the mode change controller 222 may be used to control timing of a change in mode of operation of a switching mode power converter from a current mode of operation to another mode of operation, based on one or more processed binary electrical event signals chosen by mode change controller 222 from processed event bus 206.

In another embodiment mode controller 222 could instead be connected to selected event bus 207 rather than the processed event bus 203 and mode change timing could be based on selected event signals rather than selected processed event signals.

Fault controller 220 also receives one or more event signals, from the fault bus 224, and generates a fault signal to disable an output of the switching mode power converter based on the at least one binary electrical event signal received by the fault controller. The fault signal is provided to output stage 210 in the embodiment shown, responsive to the fault controller 220 detecting a fault based on the event signal(s). Output stage 210 could, in response to the fault signal, disable the power converter's output by, for example, by forcing all switch control signals low and opening all of the power converter's switches. Fault controller 220 could optionally glitch filter and invert the selected event signal(s) that it receives from event selector 204. Fault controller 220 could optionally latch the fault signal such that the power converter's output remains disabled even if the selected event signal no longer indicates a fault. Event selector 204 could be configured to select different event signals for output on the selected event bus 207 and the fault bus 224. Thus, fault controller 220 could, but need not necessarily, use the same event signal(s) as the event processor 206 or the mode change controller 222 to detect a fault.

Figure 3:
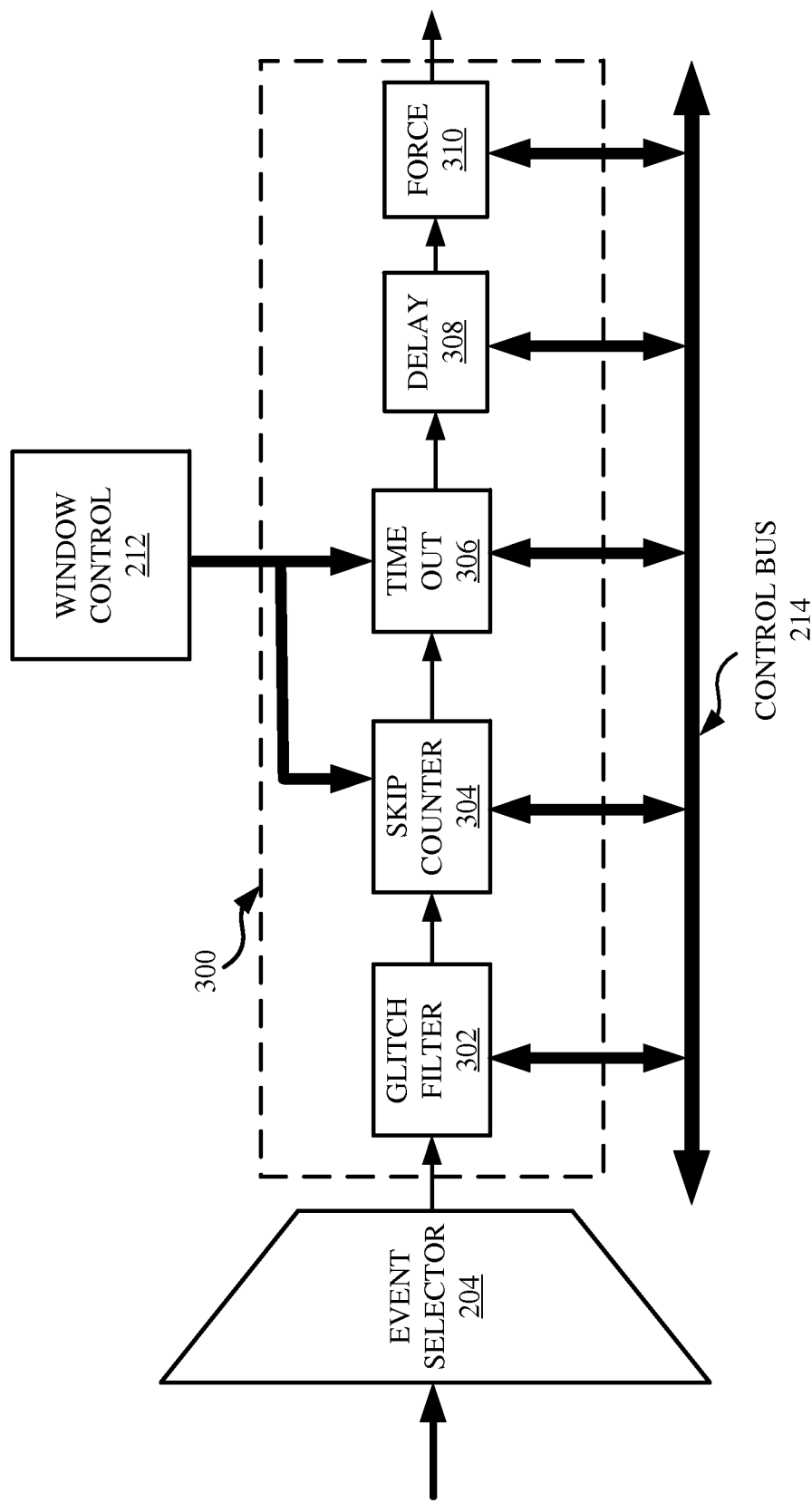
FIG. 3 is a block diagram of an example event processor circuit.

FIG. 3 is a block diagram of an example event processor circuit. Event processor circuit 300 comprises glitch filter 302, skip counter 304, time out controller 306, delay circuit 308 and force circuit 310.

Glitch filter 302, skip counter 304, time out controller 306, delay circuit 308 and force circuit 310 could all be implemented in digital logic, for example. Glitch filter 302 could be implemented as a comparator and a counter and only allows a logic transition after a specified number of samples of the event signal are all the same value. Skip counter 304 could be implemented as a down counter loaded with the skip count and decremented on every event signal pulse. Time out controller 306 could be implemented as a clocked up counter incremented by the system clock of the power converter. Delay circuit 308 could be implemented as a counter. Force circuit 310 could be implemented using combinatorial logic.

Event processor 206 of FIG. 2 comprises a plurality of event processor circuits, each with a structure as shown at 300, in an embodiment. For example, in one embodiment there is one respective event processor circuit for each selected electrical event signal that is to be used in switch control. In an embodiment noted above in which 16 event signals are selected, event processor 206 of FIG. 2 comprises 16 event processor circuits 300 operating in parallel.

Respective event processor circuits 300 could be provided for the maximum number of event signals that could be selected. For example, a generic switching control architecture might support generation of up to 8 switch control signals based on selection of up to 16 event signals. In this case, 16 event processor circuits could be provided, but not all would necessarily always be used. If only 8 event signals are selected for generation of 4 switch control signals, for instance, then not all of the event processor circuits would be used.

Event selector 204 provides a selected electrical event signal to event processor circuit 300. Glitch filter 302 optionally glitch-filters and optionally inverts the selected electrical event signal so that either rising or falling edges of an electrical event signal could be used as the filtered electrical event signal for further processing. In an embodiment, glitch filter 302 removes electrical events with a duration shorter than a minimum time and could aid in providing noise immunity and preventing spurious signals from disrupting the operation of the power converter. Glitch filter 302 could comprise a programmable register into which filter parameters such as glitching time and signal inversion are written from control bus 214.

The optionally glitch filtered electrical event signal is provided to skip counter 304. For some power converter topologies and operating modes such as, for example, quasi-resonant topologies it could be desirable not to change the state of a power converter's switch(es) after the first occurrence of an electrical event, but to instead respond only after the Mth occurrence of the electrical event, and therefore skip the first M−1 electrical events. For example, it could be desirable to only close a switch after the Mth occurrence of an oscillatory voltage minimum across it. This is frequently referred to as "valley hopping". Skip counter 304 optionally skip filters the electrical event signal and provides a skip filtered event signal to Time out controller 306. Thus, in more general terms, skip counter 304 is programmable, using one or more registers for example, to pass a signal, or count occurrences of a respective selected binary electrical event signal and provide an output responsive to counting a programmable number of occurrences.

Skip counter 304 could comprise a programmable register into which skip parameters such as number of electrical events to skip are written from control bus 214. The skip count could be initialized by the beginning of the electrical event's associated timing window as determined by window controller 212.

Time out controller 306 optionally generates an electrical event signal after a specified time out period if the electrical event has not occurred during the timeout period. Time out controller 306 could be used to provide timing limits. Time out controller 306 could be used, for example, to limit the duty cycle of a power converter to a maximum value by generating the electrical event signal to trigger the opening or closing of switch(es) if an electrical event signal has not been received by the expiry of a duty cycle time out period. Thus, in an embodiment, time out controller 306 is programmable, using one or more registers for example, to pass a signal or generate a binary electrical event signal if the binary electrical event signal is not received after a programmable time out period. The beginning of the time out period could be initiated by the beginning of the electrical event's associated timing window as determined by window controller 212.

Time out controller 306 could comprise a programmable register into which parameters such as the time out value are written from control bus 214.

The output of time out controller 306 is provided to delay circuit 308. Delay circuit 308 could optionally delay (either immediately pass or pass after a time delay to) the electrical event signal by a specific delay time. For example, delay circuit 308 could be programmable, such as by using one or more registers, to pass a signal or apply a programmable time delay to the signal. For some power converter topologies or modes of operation it may be desirable to introduce a delay between the occurrence of an electrical event and the consequent generation of switch control signal(s). Delay circuit 308 could comprise a programmable register into which parameters such as the delay value are written from control bus 214.

Delay circuit 308 provides an optionally delayed event signal to force circuit 310. Force circuit 310 could optionally generate an event signal regardless of the occurrence of the electrical event that corresponds to the event signal. For example, force circuit 310 could be programmable, such as by using one or more registers, to pass a signal or generate a respective selected binary electrical event signal independently of occurrence of an electrical event corresponding to the respective selected binary electrical event signal. Force circuit 310 could therefore "force" the generation of switch control signal(s) independent of the state of the event signal and timing. Force circuit 310 could be used for example, to set a switch to a specific conduction state for an operating mode in which the switch is static and unchanging. For example, when dual half bridge 100 of FIG. 1A is operated as an asynchronous buck as depicted in FIG. 1B, switches 162 and 164 are held open and are not switched. Force circuit 310 could therefore be used to keep switches 162 and 164 open throughout the entire switching cycle. Force circuit 310 could also or instead be used for debugging purposes. Force circuit 308 could comprise a programmable register into which parameters such as the direction of forcing (HIGH or LOW) are written from control bus 214.

Event processor circuit 300 is an example of an implementation in which an event processor is programmable to output a processed binary electrical event signal under one or more of the following conditions: the binary electrical event signal that is processed into a processed binary electrical event signal was received within a timing window; after a delay time from receipt of the binary electrical event signal; after a number of occurrences of the binary electrical event signal; if the binary electrical event signal is not received within an amount of time.

Figure 4:
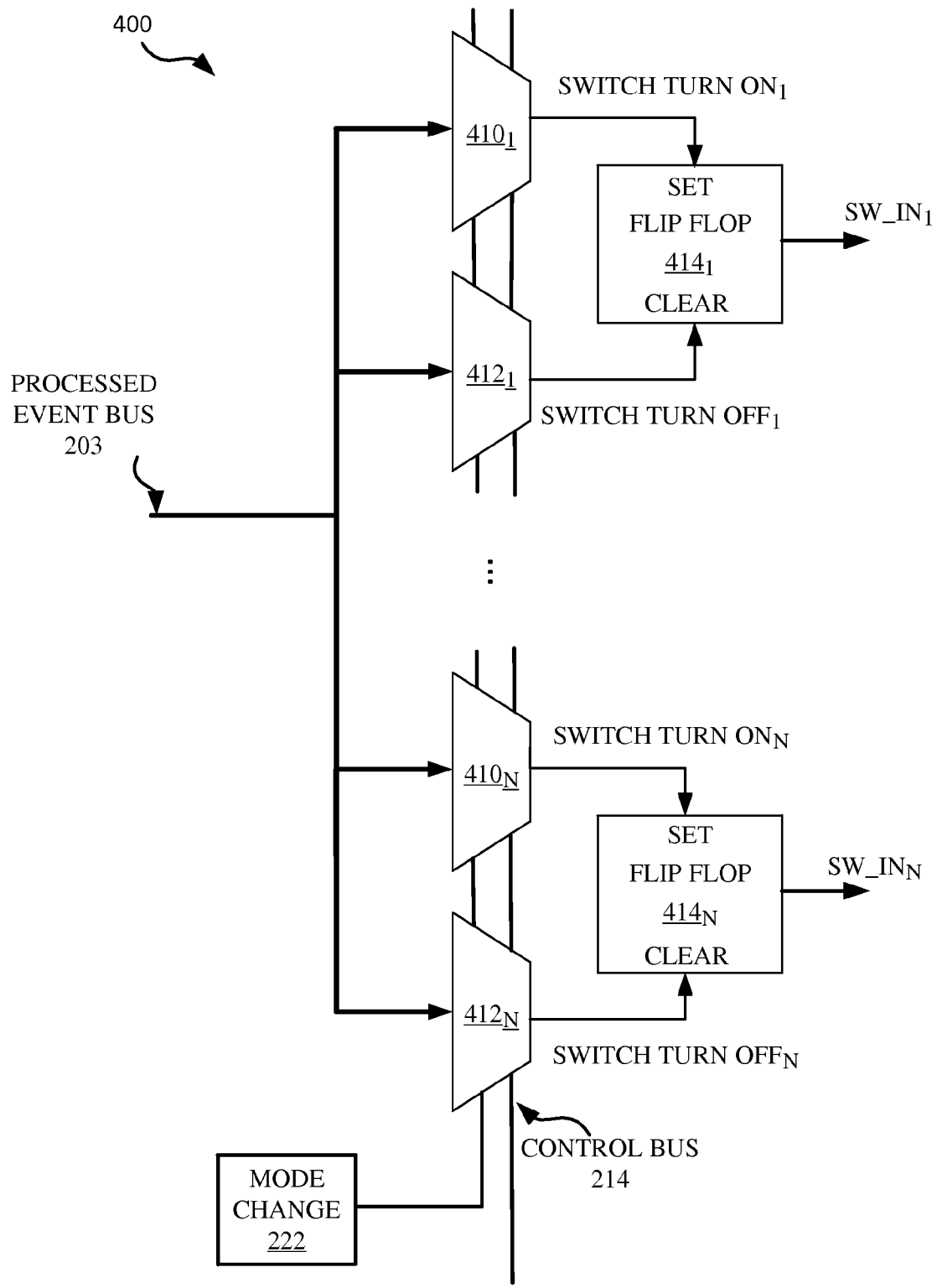
FIG. 4 is a block diagram of an example conversion controller.

FIG. 4 is a block diagram of an example conversion controller 400. Conversion controller 400 comprises turn-on selectors $410_1 \ldots 410_N$, turn-off selectors $412_1 \ldots 412_N$ and flip-flops $414_1 \ldots 414_N$. Turn-on selectors $410_1 \ldots 410_N$ select single processed event signals from the plurality of processed event signals on processed event bus 203 as switch turn-on signals and provide them to the SET terminal of flip-flops $414_1 \ldots 414_N$. Turn-off selectors $412_1 \ldots 412_N$ select single processed event signals from the plurality of processed event signals on processed event bus 203 as switch turn-off signals and provide them to the CLEAR terminal of flip flops $414_1 \ldots 414_N$. A logic HIGH at the SET terminal of each flip-flop $414_1 \ldots 414_N$ sets the flip flop output to a logic HIGH and a logic HIGH at the input of the CLEAR terminal sets the flip-flop output to a logic LOW. In this embodiment, the switch turn-on signals and the switch turn-off signals are to control switches in a power converter, but indirectly, by setting or clearing the flip-flop outputs. The flip-flop outputs are preprocessed switch control signals that are provided to output stage 210 (FIG. 2), which selects the preprocessed switch control signals that are to be output to the power converter switches.

Each of turn-on selectors $410_1 \ldots 410_N$ and turn-off selectors $412_1 \ldots 412_N$ could comprise a programmable register into which parameters (such as the choice of single processed event signals to be selected as the switch turn-on signals and switch turn-off signals) are written from control bus 214. A change in a power converter's operating mode could be accomplished by writing new values corresponding to the new operating mode into these registers under the control of a mode change controller such as mode change controller 222 of FIG. 2.

Flip-flops $414_1 \ldots 414_N$ produce preprocessed switch control signals $SW\_IN_1 \ldots SW\_IN_N$. $SW\_IN_1 \ldots SW\_IN_N$ and are set to a logic HIGH when the selected switch turn-on signal is HIGH. $SW\_IN_1 \ldots SW\_IN_N$ are cleared and set a logic LOW when the selected switch turn-off signal is set to a logic HIGH. In this example, any of the processed event signals on processed event bus 203 can be selected to set a preprocessed switch control signal $SW\_IN_1 \ldots SW\_IN_N$ either HIGH or LOW and therefore turn ON or turn OFF a power converter's switch. The value of N could be set by the maximum number of switches in the power converter. In one embodiment N is 8. As noted above regarding event processor circuits, not every selector pair/flip-flop combination might be used in every implementation, depending on the number of switch control signals that are to be generated.

The example shown in FIG. 4 also illustrates how 2N selected processed event signals, which respectively correspond to 2N selected event signals, are used to generate N preprocessed switch control signals $SW\_IN_1 \ldots SW\_IN_N$.

FIG. 4 is an example of an event based conversion controller, and other types of conversion controllers are possible.

For example a Pulse Width Modulation (PWM) based conversion controller could be used in conjunction with the event based conversion controller of FIG. 4. In an embodiment of a PWM based conversion controller, the switch control signals are derived from a single square wave oscillator with a defined frequency and duty cycle. The frequency and/or duty cycle of the oscillator could be determined by a feedback loop and not by real time electrical event signals. In one embodiment the output voltage of the power converter is compared to a reference voltage and an error signal proportional to the difference is generated. In this embodiment the error signal is not an event signal since it is not digital. The error signal could modulate the frequency or duty cycle of the oscillator.

The frequency and duty cycle of the derived switch control signals could be identical to the oscillator frequency, however the phase and/or polarity could be different. In one embodiment the PWM based conversion controller produces 8 preprocessed switch control signals.

For example, when Dual Half Bridge 100 of FIG. 1A is operated as a full bridge, switch control signals for the control of switches 160, 166 could be substantially identical to the oscillator signal and switch control signals for the control of switches 162, 164 could be substantially the inversion of the oscillator signal, with suitable dead times between complementary signals to avoid complementary switches being ON at the same time.

In one embodiment, conversion controller 208 of FIG. 2 comprises both an event based conversion controller and a PWM based conversion controller, each producing up to 8 preprocessed switch control signals. In this embodiment output stage 210 selects between the event based preprocessed switch control signals and the PWM based preprocessed switch control signals to control the power converter switches. The output stage 210 could select the same type (event based or PWM based) of preprocessed switch control signals for all switches in a particular switching cycle of the power converter, although potentially different types of preprocessed switch control signals could be selected for different switches.

Figure 5:
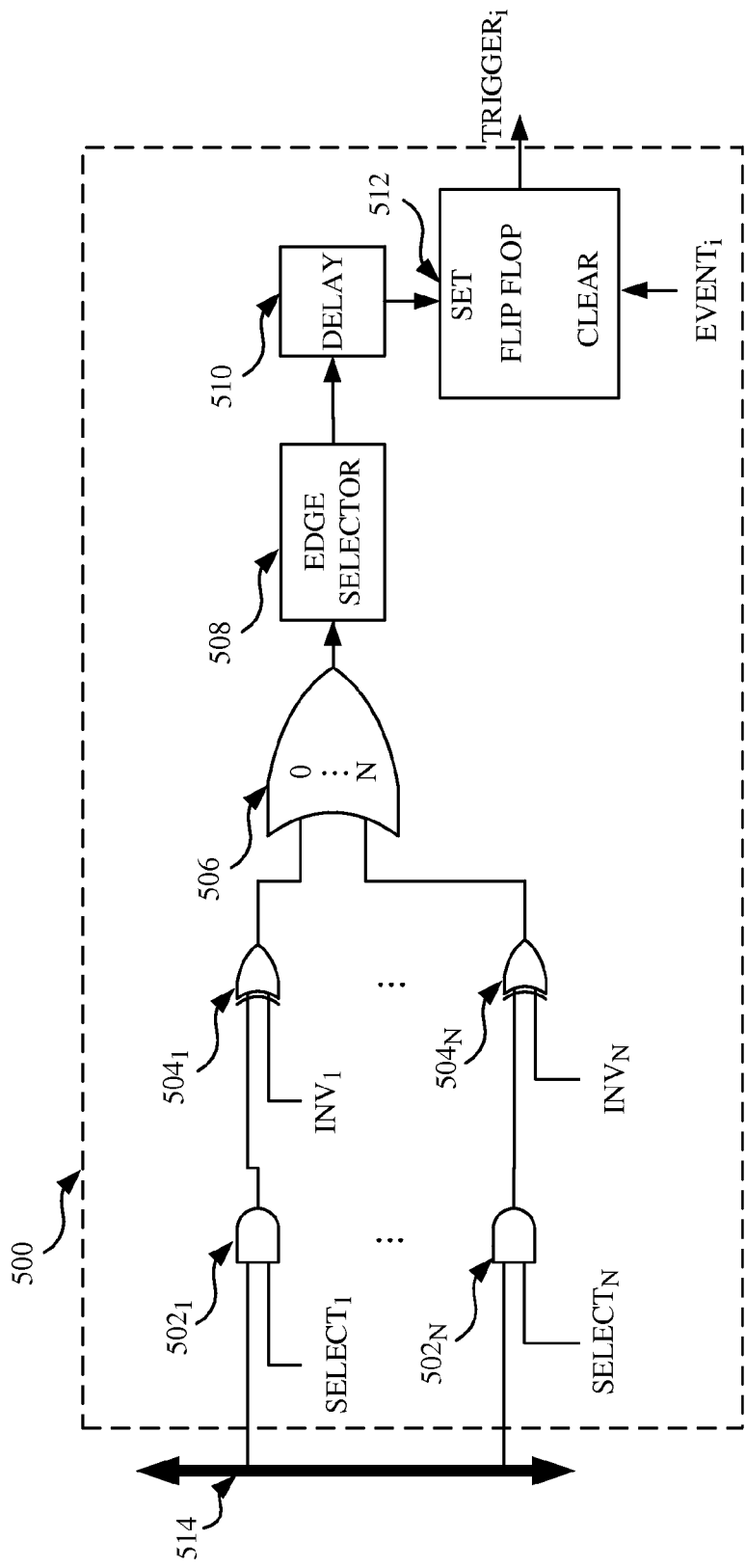
FIG. 5 is a block diagram of an example window controller circuit.

FIG. 5 is a block diagram of an example window controller circuit. Window controller circuit 500 comprises AND gates $502_1 \ldots 502_N$, Exclusive OR (XOR) gates $504_1 \ldots 504_N$, N input OR gate 506, edge selector 508, delay circuit 510 and flip-flop 512. In an embodiment, window controller 212 of FIG. 2 comprises a plurality of window controller circuits, illustratively one respective window controller circuit having a structure as shown at 500 for each of the number of event signals that can be selected at any time by event selector 204. In one embodiment, window controller 212 comprises 16 window control circuits 500 operating in parallel. As noted above for event processor circuits, not every window controller circuit is necessarily always in use, depending on the number of event signals that are selected.

Window controller circuit 500 receives selected switch control signals from selected switch control bus 514 and generates a trigger signal $TRIGGER_i$. In an embodiment, when $TRIGGER_i$ is logic HIGH the timing window for the ith selected event signal is open and receipt of an event signal indicating occurrence of the event is considered valid, and when $TRIGGER_i$ is logic LOW the timing window is closed.

AND gates $502_1 \ldots 502_N$ select switching signals from selected switch control bus 514 based on the value of select signals $SELECT_1 \ldots SELECT_N$. XOR gates $504_1 \ldots 504_N$ provide optional inversion of the selected switch signals based on the value of inversion signals $INV_1 \ldots INV_N$. In an embodiment, $SELECT_1 \ldots SELECT_N$ and $INV_1 \ldots INV_N$ are read from one or more registers that are loaded from control bus 214 (FIG. 2).

OR gate 506 provides logical ORing of the selected and optionally inverted switch control signals. Edge selector 508 provides optional selection of either a rising or falling edge of the output of OR gate 506 as the start of the timing window. Delay element 510 provides for optional delay of the start of the timing window from the change in state of the switch control signals.

The timing window for the ith event signal is closed by the ith processed event signal ($EVENT_i$) going high, clearing flip flop 512 and setting $TRIGGER_i$ to a logic LOW.

In summary, the timing window for an event is opened by a change of the state(s) of the power converter's switch(es) and is closed by the event's occurrence.

Output stage 210 of FIG. 2 receives preprocessed switch control signals $SW\_IN_1 \ldots SW\_IN_N$ and generates switch control signals $SW_1 \ldots SW_N$. Switch control signals $SW_1 \ldots SW_N$ directly control the state of the power converter's switches. Output stage 210 could also generate switching control signals for window controller 212.

Output stage 210 could select which preprocessed switch control signals $SW\_IN_1 \ldots SW\_IN_N$ generate which switch control signals $SW_1 \ldots SW_N$. In one embodiment, output stage 210 could select 8 $SW_1 \ldots SW_N$ from 16 $SW\_IN_1 \ldots SW\_IN_N$ signals.

Processing of the SW_IN signals by output stage 210 could provide for the non-overlap of complementary $SW_1 \ldots SW_N$ signals by the provision of a minimum "dead time" between a $SW_1 \ldots SW_N$ signal going LOW and its complement switch signal going HIGH. For example, referring to Dual Half Bridge of FIG. 1A operated as a full bridge, the complement to the switch control signal for switch 160 is the switch control signal for switch 162. A dead time between these two switch control signals prevents their switches from both being closed at the same time and could increase efficiency and reduce noise.

Output stage 210 could also or instead provide for the optional forcing of a switch control signal into a specific state. Forcing a switch control signal using output stage 210 could provide a faster response than using the force function of event processor circuit 300 (FIG. 3), for example.

Output stage 210 could also or instead provide enable/disable of all gate control signals and fault handling. For example, a fault condition could be an over current or over voltage condition in the power converter and the output stage 210 could, in response to the fault condition, for example, open all of the power converter's switches by forcing all switch control signals low. Output stage 210 could be notified of the fault condition by, for example, fault detector 220 of FIG. 2.

Output stage 210 could also or instead provide other signal processing functions such as deglitching.

Figure 6:
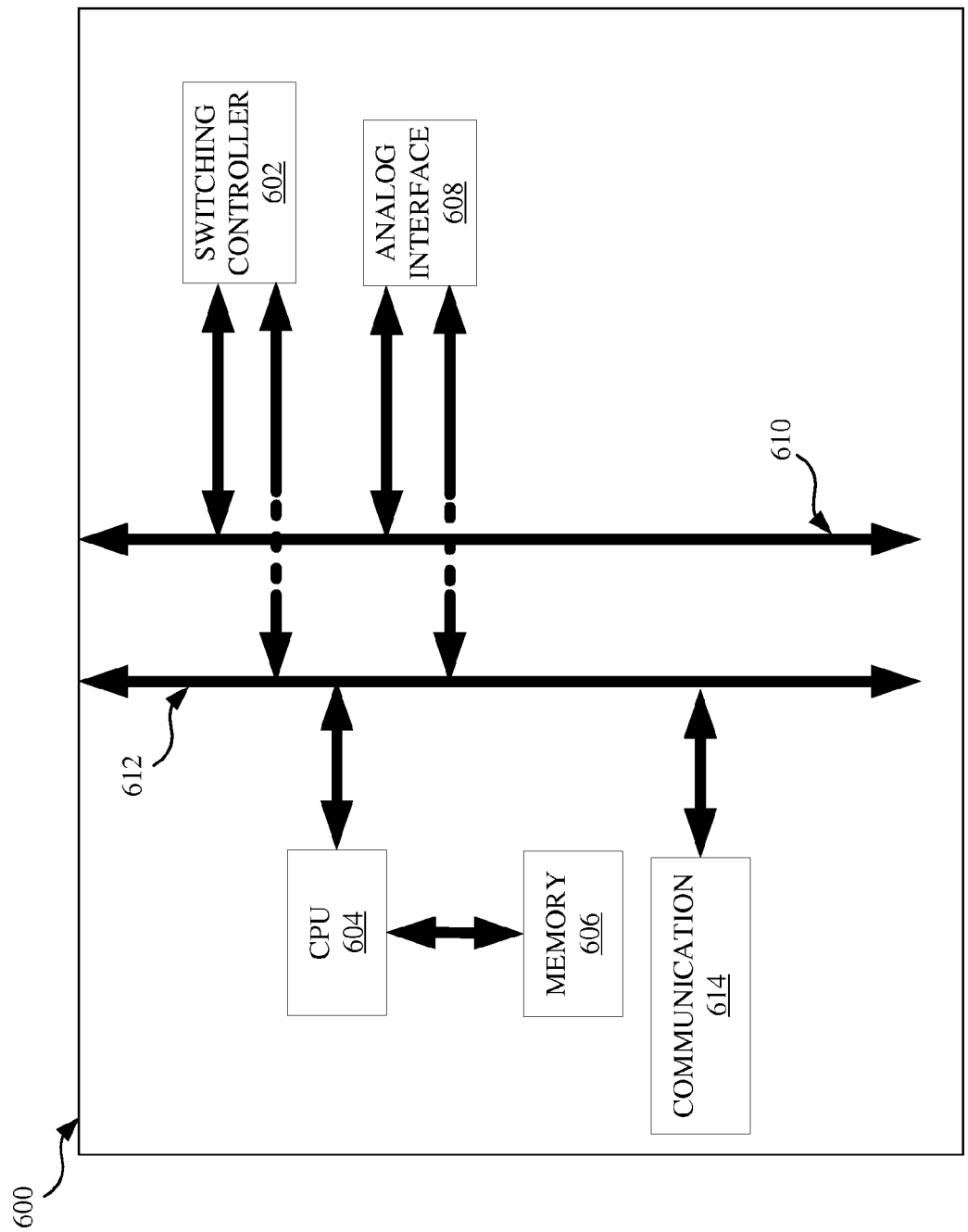
FIG. 6 is a block diagram of an example controller.

FIG. 6 is a block diagram of an example controller, which could be implemented in an IC suitable to control a switching mode power converter or supply. Controller IC 600 comprises switching controller 602, Central Processing Unit (CPU) 604, memory 606, analog interface 608, event bus 610, data and control bus 612 and communication unit 614.

Analog interface 608 could comprise analog circuitry such as one or more comparators, one or more slew rate detectors, and/or one or more analog to digital converters (ADCs), for example. Analog interface 608 could detect electrical events and provide event signals to event bus 610. In one embodiment analog interface 608 comprises two slew rate detectors, two programmable dV/dt (voltage slew rate) sensors, an eight-channel 10-bit, 1.4 MS/s ADC, two four-channel 10-bit, 1.4 MS/s ADCs, twenty-four 10 ns fast comparators, a differential current sensing amplifier interface and a temperature sensor.

Event bus 610 could provide event signals to switching controller 602. CPU 604 could control the operation of switching controller 602 by writing data to its registers through control bus 612. In one embodiment CPU 604 is a 32 bit RISC (Reduced Instruction Set) processor.

Memory 606 could contain firmware and data for the operation of CPU 604. In one embodiment memory 606 comprises 64 KB of SRAM (Static Random Access Memory), 256 KB of flash memory and 4 KB of ROM (READ Only Memory).

Figure 7:
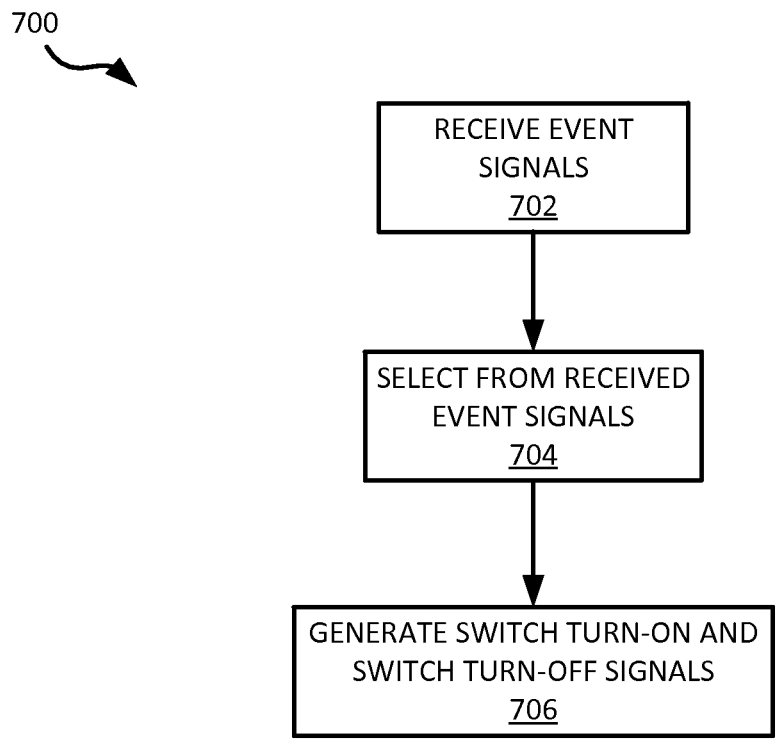
FIG. 7 is a flow diagram of an example method.

Communication unit 614 could provide for communications with components in the power converter. Communication unit 614 could include circuitry to provide for communications over multiple interface standards including I²C (Inter-Integrated Circuit), UART (Universal Asynchronous Receiver Transmitter) and/or SPI (Serial Peripheral Interface), for example. Although the foregoing description relates primarily to system or apparatus embodiments, method embodiments are also contemplated. FIG. 7 is a flow diagram of an example method. The example method 700 relates to generating switching control signals for control of switches in a switching mode power converter, and includes an operation 700 of receiving binary electrical event signals. At 704, at least two binary electrical event signals are selected from the received binary electrical event signals. The at least two binary electrical event signals that are selected include fewer than all of the received binary electrical event signals. The at least two selected binary electrical event signal are optionally processed in generating respective processed binary electrical event signals. At 706, switch turn-on and switch turn-off signals are generated. In an embodiment, this involves selecting one of the respective processed binary electrical event signals as a switch turn-on signal, and selecting another of the respective processed binary electrical event signals as a switch turn-off signal, to control at least one switch in the switching mode power converter.

The operations shown in FIG. 7 could be repeated, in each power converter switching cycle for example.

What has been described is merely illustrative of the application of principles of embodiments of the present disclosure. Other arrangements and methods can be implemented by those skilled in the art.

For example, it should be appreciated that the contents of the drawings are intended solely for illustrative purposes, and that the present invention is in no way limited to the particular example embodiments explicitly shown in the drawings and described herein. Other embodiments may include additional, fewer, and/or additional components coupled together in a similar manner as shown or in a different manner. In the case of method embodiments, operations that are described herein may be performed in a different order than shown in the drawings or described above, and other embodiments could involve additional or fewer operations. Examples of additional operations will be apparent from the description and drawings relating to system or apparatus implementations, for example, and further variations may be or become apparent. Method operations could also or instead be performed in any of various different ways, and examples of such options are also discussed with reference to system or apparatus embodiments.

The invention claimed is:

1. A switching controller for control of switches in a switching mode power converter, the switching controller comprising:
a selector, programmable to select at least any two binary electrical event signals from a plurality of binary electrical event signals that are available at an input of the selector, the at least two binary electrical event signals comprising fewer than all of the available binary electrical event signals;
an event processor, coupled to the selector, programmable to optionally process said at least two binary electrical event signals in generating respective processed binary electrical event signals;
a conversion controller, coupled to the event processor, programmable to select one of said respective processed binary electrical event signals as a switch turn-on signal and select another of said respective processed binary electrical event signals as a switch turn-off signal, to control at least one of said switches in said switching mode power converter,
wherein the event processor comprises a plurality of processing circuits to process respective selected binary electrical event signals, each of the processing circuits comprising one or more of:
a skip counter programmable to pass a signal, or count occurrences of a respective selected binary electrical event signal and provide an output responsive to counting a programmable number of occurrences of the respective selected binary electrical event signal;
a time out controller, programmable to pass a signal or to generate a binary electrical event signal if the binary electrical event signal is not received after a programmable time out period;
a delay circuit, programmable to pass a signal or apply a programmable time delay to the signal;
a force circuit, programmable to pass a signal or generate a respective selected binary electrical event signal independently of occurrence of an electrical event corresponding to the respective selected binary electrical event signal.

2. The switching controller of claim 1, wherein the switching mode power converter operates in a plurality of event based modes of operation, and wherein, for each event based mode of operation, the selector is programmable to select the at least two binary electrical event signals corresponding to a current mode of operation of the plurality of modes of operation.

3. The switching controller of claim 1, wherein the switching mode power converter operates in a plurality of event based modes of operation, and wherein, for each event based mode of operation, the conversion controller is programmable to select processed binary electrical event signals as said switch turn-on and switch turn-off signals corresponding to a current mode of operation of the plurality of modes of operation.

4. The switching controller of claim 1, wherein the switching mode power converter operates in a plurality of event based modes of operation, the switching controller further comprising:
a mode change controller, operatively coupled to the event processor and to the conversion controller, programmable to select at least one processed binary electrical event signal from the event processor and to provide to the conversion controller a mode change instruction, to control timing of a change in mode of operation of the switching mode power converter from a current mode of operation to another mode of operation of the plurality of modes of operation, based on the at least one processed binary electrical event signal selected by the mode change controller from the event processor.

5. The switching controller of claim 1, further comprising:
a fault controller operatively coupled to the selector to receive at least one binary electrical event signal from the selector and to generate a fault signal to disable an output of the switching mode power converter based on the at least one binary electrical event signal received by the fault controller.

6. The switching controller of claim 5, wherein the timing of one or both of the switch turn-on signal and the switch turn-off signal in a switching cycle is based on the binary electrical event signals.

7. The switching controller of claim 1, wherein the plurality of binary electrical event signals comprise any one or more of:
a binary electrical event signal indicating that a current has reached a threshold current value;
a binary electrical event signal indicating that a voltage has reached a threshold voltage value;
a binary electrical event signal indicating that a slew rate of current has reached a threshold current slew rate value;
a binary electrical event signal indicating that a slew rate of voltage has reached a threshold voltage slew rate value.

8. The switching controller of claim 1, wherein the event processor is programmable to output each processed binary electrical event signal under one or more of the following conditions:
the binary electrical event signal that is processed into a processed binary electrical event signal was received within a timing window;
after a delay time from receipt of the binary electrical event signal;
after a number of occurrences of the binary electrical event signal;

if the binary electrical event signal is not received within an amount of time.

9. The switching controller of claim 1, further comprising:
a window controller, operatively coupled to the event processor, programmable to select at least one switch control signal from a plurality of switch control signals, to provide timing window control of binary electrical event signal processing by providing trigger signals to the event processor based on timing of the at least one selected switch control signal.

10. The switching controller of claim 9, wherein the event processor is configured to ignore a selected binary electrical event signal that is received outside a timing window indicated by a trigger signal received from the window controller.

11. The switching controller of claim 1, further comprising:
a Pulse Width Modulation (PWM) based conversion controller.

12. The switching controller of claim 1, wherein a number of binary electrical event signals selected by the selector, and a number of switch turn-on and switch turn-off signals generated by the conversion controller are programmable.

13. A method to generate switching control signals for control of switches in a switching mode power converter, the method comprising:
receiving a plurality of binary electrical event signals;
selecting at least any two binary electrical event signals from said plurality of binary electrical event signals, the at least two binary electrical event signals comprising fewer than all of the plurality of binary electrical event signals;
optionally processing said at least two binary electrical event signals in generating respective processed binary electrical event signals;
selecting one of said respective processed binary event signals as a switch turn-on signal and selecting another of said respective processed binary electrical event signals as a switch turn-off signal, to control at least one of said switches in said switching mode power converter,
the method further comprising one or more of:
passing a respective selected binary electrical event signal, or counting occurrences of a respective selected binary electrical event signal and providing an output responsive to counting a programmable number of occurrences of the respective selected binary electrical event signal;
passing a respective selected binary electrical event signal or generating a binary electrical event signal if the binary electrical event signal is not received after a time out period;
passing a respective selected binary electrical event signal or applying a time delay to the respective selected binary electrical event signal;
generating a respective binary electrical event signal independently of occurrence of an electrical event corresponding to the respective binary electrical event signal.

14. The method of claim 13, further comprising:
detecting occurrence of a plurality of electrical events in the switching mode power converter;
generating the plurality of binary electrical event signals responsive to detecting respective ones of the plurality of electrical events.

15. The method of claim 13, wherein the switching mode power converter operates in a plurality of event based modes of operation, and wherein, for each event based operating mode the selecting at least any two binary electrical event signals from said plurality of binary electrical event signals comprises selecting the at least two binary electrical event signals corresponding to a current mode of operation of the plurality of modes of operation.

16. The method of claim 13, wherein the switching mode power converter operates in a plurality of event based modes of operation, and wherein, for each event based operating mode the selecting one of said at least two processed selected binary event signals and the selecting another of said at least two processed binary event signals corresponds to a current mode of operation of the plurality of modes of operation.

17. The method of claim 13, wherein the switching mode power converter operates in a plurality of event based modes of operation, the method further comprising:
selecting at least one processed binary electrical event signal; and
controlling timing of a change in mode of operation of the switching mode power converter from a current mode of operation to another mode of operation of the plurality of modes of operation based on said at least one selected processed binary electrical event signal.

18. The method of claim 13, further comprising:
selecting at least one binary electrical event signal from said plurality of binary event signals and detecting a fault based on said at least one selected binary electrical event signal.

19. The method of claim 13, wherein the plurality of binary electrical event signals comprise any one or more of:
a binary electrical event signal indicating that a current has reached a threshold current value;
a binary electrical event signal indicating that a voltage has reached a threshold voltage value;
a binary electrical event signal indicating that a slew rate of current has reached a threshold current slew rate value;
a binary electrical event signal indicating that a slew rate of voltage has reached a threshold voltage slew rate value.

20. The method of claim 13, further comprising:
selecting at least one switch control signal from a plurality of switch control signals;
setting a timing window based on timing of the at least one selected switch control signal; and
ignoring a selected binary electrical event signal that is received outside said timing window.

21. The method of claim 13, further comprising:
generating a Pulse Width Modulation (PWM) based switching control signal, to control at least one of the switches in said switching mode power converter.

* * * * *